US012128753B2

(12) United States Patent
Ikeda et al.

(10) Patent No.: US 12,128,753 B2
(45) Date of Patent: Oct. 29, 2024

(54) LOWER STRUCTURE FOR HYBRID AUTOMOBILE

(71) Applicant: Mazda Motor Corporation, Hiroshima (JP)

(72) Inventors: Yoshinori Ikeda, Hiroshima (JP); Tsutomu Shibata, Hiroshima (JP); Yosuke Sawada, Hiroshima (JP); Tetsuya Shimomura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 359 days.

(21) Appl. No.: 17/867,715

(22) Filed: Jul. 19, 2022

(65) Prior Publication Data

US 2023/0023059 A1    Jan. 26, 2023

(30) Foreign Application Priority Data

Jul. 26, 2021    (JP) .................................. 2021-121917

(51) Int. Cl.

| | |
|---|---|
| *B60K 1/04* | (2019.01) |
| *B60R 16/02* | (2006.01) |
| *B62D 21/15* | (2006.01) |
| *F01N 13/18* | (2010.01) |
| *F24H 4/00* | (2006.01) |

(52) U.S. Cl.

CPC ............ *B60K 1/04* (2013.01); *B60R 16/0207* (2013.01); *B62D 21/152* (2013.01); *F01N 13/1805* (2013.01); *F24H 4/00* (2013.01); *B60K 2001/0438* (2013.01)

(58) Field of Classification Search

CPC .... B60K 2001/0405; B60K 2001/0438; B60K 13/04; B60K 13/06; B62D 21/15; B62D 21/155; F01N 13/1805; F01N 13/1811; F01N 13/1822

See application file for complete search history.

(56) References Cited

U.S. PATENT DOCUMENTS

| | | | | |
|---|---|---|---|---|
| 9,688,314 | B2 * | 6/2017 | Ajisaka | ................ B60K 15/073 |
| 11,124,135 | B2 * | 9/2021 | Yamada | .................. B60L 50/64 |

(Continued)

FOREIGN PATENT DOCUMENTS

| | | |
|---|---|---|
| JP | 2013-67334 A | 4/2013 |
| JP | 2016-2772 A | 1/2016 |
| JP | 2020-172879 A | 10/2020 |

*Primary Examiner* — Jeffrey J Restifo (74) *Attorney, Agent, or Firm* — XSENSUS LLP (57) ABSTRACT

A lower structure for a hybrid automobile in which a high-voltage battery is disposed in a lower surface of a floor panel includes an engine exhaust system component which is disposed in front of the high-voltage battery in the lower surface of the floor panel and on one vehicle-width-direction side of a center in a vehicle width direction and high-voltage devices which are disposed in front of the high-voltage battery and on another vehicle-width-direction side of the center in the vehicle width direction. In-vehicle equipment is disposed between the high-voltage battery and the high-voltage devices, and the in-vehicle equipment is in an inclined state where an upper surface of the in-vehicle equipment is inclined in a front-rear direction such that the in-vehicle equipment has a shorter dimension in the front-rear direction than a dimension in a horizontal state where the upper surface becomes horizontal.

12 Claims, 10 Drawing Sheets

(56) References Cited

U.S. PATENT DOCUMENTS

| | | | |
|---|---|---|---|
| 11,299,211 B2* | 4/2022 | Matsuda | B62D 27/023 |
| 11,524,725 B2* | 12/2022 | Kohara | B60K 1/04 |
| 11,639,198 B2* | 5/2023 | Kohara | B62D 25/20 |
| | | | 180/232 |
| 11,807,095 B2* | 11/2023 | Harugaichi | B60K 1/04 |
| 11,919,570 B2* | 3/2024 | Sato | B60K 1/04 |
| 11,993,313 B2* | 5/2024 | Natsume | B62D 25/025 |
| 12,049,130 B2* | 7/2024 | Harugaichi | H01M 50/249 |
| 2013/0075173 A1* | 3/2013 | Kato | H01M 50/249 |
| | | | 180/68.5 |
| 2015/0360572 A1* | 12/2015 | Yamamoto | B60L 50/16 |
| | | | 290/45 |
| 2023/0023059 A1* | 1/2023 | Ikeda | F24H 4/00 |
| 2023/0257028 A1* | 8/2023 | Adachi | B60K 1/04 |
| | | | 180/68.5 |

* cited by examiner

LOWER STRUCTURE FOR HYBRID AUTOMOBILE

CROSS-REFERENCE TO RELATED APPLICATION

The present application claims priority to Japanese application number 2021-121917 filed in the Japanese Patent Office on Jul. 26, 2021, the entire contents of which are incorporated herein by reference.

TECHNICAL FIELD

The present disclosure relates to a lower structure for a hybrid automobile.

BACKGROUND

Patent Literature 1 discloses a hybrid vehicle. In a lower surface of a floor panel of this hybrid vehicle, a high-voltage battery and an inverter, a converter, and so forth as high-voltage devices are arranged. This high-voltage battery is a battery of 48 V and is arranged in an internal portion of a tunnel portion. The inverter and the converter are arranged in a region on a left side in the tunnel portion while being aligned in a front-rear direction.

Patent Literature 2 discloses a battery support structure for a vehicle which supports battery packs below a floor of a passenger vehicle as a hybrid vehicle of a gasoline engine and an electric drive. These battery packs are hung on brackets on both of left and right sides of a floor tunnel.

Patent Literature 3 discloses an electric vehicle. In this electric vehicle, an exhaust pipe is arranged on a right side of the vehicle, and on a left side as its opposite side, a front drive motor and an electricity generation motor are arranged. Further, in a case where the exhaust pipe is arranged on the left side of the vehicle, on the right side as its opposite side, the front drive motor and the electricity generation motor are arranged. Thus, the front drive motor and the electricity generation motor are made not influenced by heat transmitted from the exhaust pipe.

(Patent Literature 1) Japanese Patent Laid-Open No. 2020-172879

[Patent Literature 2] Japanese Patent Laid-Open No. 2013-067334

[Patent Literature 3] Japanese Patent Laid-Open No. 2016-002772

SUMMARY

Problems to be Solved

Incidentally, in a lower surface of a floor panel of a hybrid vehicle, high-voltage devices such as an inverter and a converter, in-vehicle equipment, a battery unit, engine exhaust system components are arranged. Thus, in the hybrid vehicle, the high-voltage devices, the in-vehicle equipment, and so forth need to be protected from heat damage due to the engine exhaust system components. In addition, in order to gain an electric traveling distance of the hybrid vehicle, a large battery unit may be disposed. However, when a large battery unit is disposed in the lower surface of the floor panel, it becomes difficult to secure a space for disposing the in-vehicle equipment in the lower surface of the floor panel.

Solutions for Solving the Problems

Accordingly, the present disclosure provides a structure in which in-vehicle equipment can be disposed even in a hybrid vehicle in which a large battery unit is disposed in a lower surface of a floor panel.

In the present disclosure, to achieve the above object, a high-voltage device is arranged in front of a high-voltage battery unit, and between the high-voltage battery unit and the high-voltage device, in-vehicle equipment is disposed to be in an inclined state where an upper surface is inclined in a front-rear direction.

Specifically, a lower structure for a hybrid automobile, which is disclosed herein, is a lower structure for a hybrid automobile in which a high-voltage battery unit is disposed in a lower surface of a floor panel, the lower structure including:

an engine exhaust system component which is disposed in front of the high-voltage battery unit in the lower surface of the floor panel and on one vehicle-width-direction side of a center in a vehicle width direction; and a high-voltage device which is disposed in front of the high-voltage battery unit in the lower surface of the floor panel and on another vehicle-width-direction side of the center in the vehicle width direction, the lower structure being characterized in that in-vehicle equipment is disposed between the high-voltage battery unit and the high-voltage device, and the in-vehicle equipment is in an inclined state where an upper surface of the in-vehicle equipment is inclined in a front-rear direction such that the in-vehicle equipment has a shorter dimension in the front-rear direction than a dimension in a horizontal state where the upper surface becomes horizontal.

With this configuration, the in-vehicle equipment is caused to be in the inclined state, and the in-vehicle equipment can thereby be disposed in a narrow space between the high-voltage battery unit and the high-voltage device. Thus, even when a large battery unit is disposed for securing a sufficient electric traveling distance, the in-vehicle equipment can be disposed in the lower surface of the floor panel. In addition, the engine exhaust system component and the high-voltage device and in-vehicle equipment are disposed on the opposite sides in the vehicle width direction across the center in the vehicle width direction. Thus, the high-voltage device and the in-vehicle equipment can be protected from heat damage due to heat of the engine exhaust system component.

In one embodiment, the lower structure for a hybrid automobile is characterized in that the high-voltage battery unit retreats such that a front face lower portion is positioned on a vehicle rear side of a front face upper portion, the in-vehicle equipment is in an inclined state where the upper surface is downward inclined toward vehicle rear such that a back end comes to a lower position than a front end, and a back end of the upper surface of the in-vehicle equipment faces the front face lower portion of the high-voltage battery unit.

Accordingly, the front face lower portion of the high-voltage battery unit is caused to retreat compared to the front face upper portion, and a space is thereby produced in front of the front face lower portion. By using this space, the back end of the upper surface of the in-vehicle equipment in the inclined state faces the front face lower portion of the high-voltage battery unit. Consequently, the in-vehicle equipment can compactly be disposed in a narrow space between the high-voltage battery unit and the high-voltage device.

In one embodiment, the lower structure for a hybrid automobile is characterized in that the in-vehicle equipment is fixed to a mounting plate having an upper surface downward inclined toward the vehicle rear and is supported to the floor panel via the mounting plate, and an upper surface back end of the mounting plate faces the front face lower portion of the high-voltage battery unit.

When the mounting plate and the in-vehicle equipment are moved to a rear side due to a front collision of a vehicle, the upper surface of the mounting plate first contacts with the front face upper portion of the high-voltage battery unit. In this case, the contact occurs in a manner such that the front face upper portion of the high-voltage battery unit relatively slides on the inclined upper surface of the mounting plate. Accordingly, an impact applied to the high-voltage battery unit and the in-vehicle equipment due to the front collision of the vehicle can be reduced.

Further, when the in-vehicle equipment moves rearward in response to the front collision of the vehicle, the front face upper portion of the high-voltage battery unit relatively slides on the inclined upper surface of the mounting plate, and the mounting plate and the in-vehicle equipment are thereby guided to fall toward the vehicle rear. Accordingly, the mounting plate and the in-vehicle equipment can be retracted to a space produced by retreat of the front face lower portion of the high-voltage battery unit.

In one embodiment, the lower structure for a hybrid automobile is characterized in that the high-voltage battery unit includes a harness connection portion in the front face lower portion.

Consequently, a harness can be connected with the high-voltage battery unit by using a space produced by retreat of the front face lower portion of the high-voltage battery unit. As a result, electric connection with the high-voltage battery unit can be made compact.

In one embodiment, the lower structure for a hybrid automobile is characterized in that the in-vehicle equipment is a high-voltage apparatus which is supplied with electric power from the harness connection portion via a harness.

Accordingly, the harness for supplying electric power to the in-vehicle equipment can be made short, and electric connection can thereby be made compact.

In one embodiment, the high-voltage apparatus is a PTC heater for electrically heating engine cooling water.

Advantageous Effects

In the present disclosure, because an engine exhaust system component, and in-vehicle equipment and a high-voltage device are disposed on the opposite sides in a vehicle width direction across a center in the vehicle width direction, the in-vehicle equipment and the high-voltage device can be protected from heat damage due to the engine exhaust system component. Further, the in-vehicle equipment is disposed in an inclined state, and the in-vehicle equipment can thereby be disposed in a narrow space between a high-voltage battery unit and the high-voltage device. Thus, even when a space in a lower surface of a floor panel becomes narrow due to disposition of a large high-voltage battery unit, the in-vehicle equipment can be disposed.

DETAILED DESCRIPTION

The present invention will hereinafter be described in detail based on drawings. The following description is illustrative in nature only and is not at all intended to restrict the present disclosure, applications thereof, or uses thereof.

<Lower Structure for Hybrid Automobile>

Figure 1:
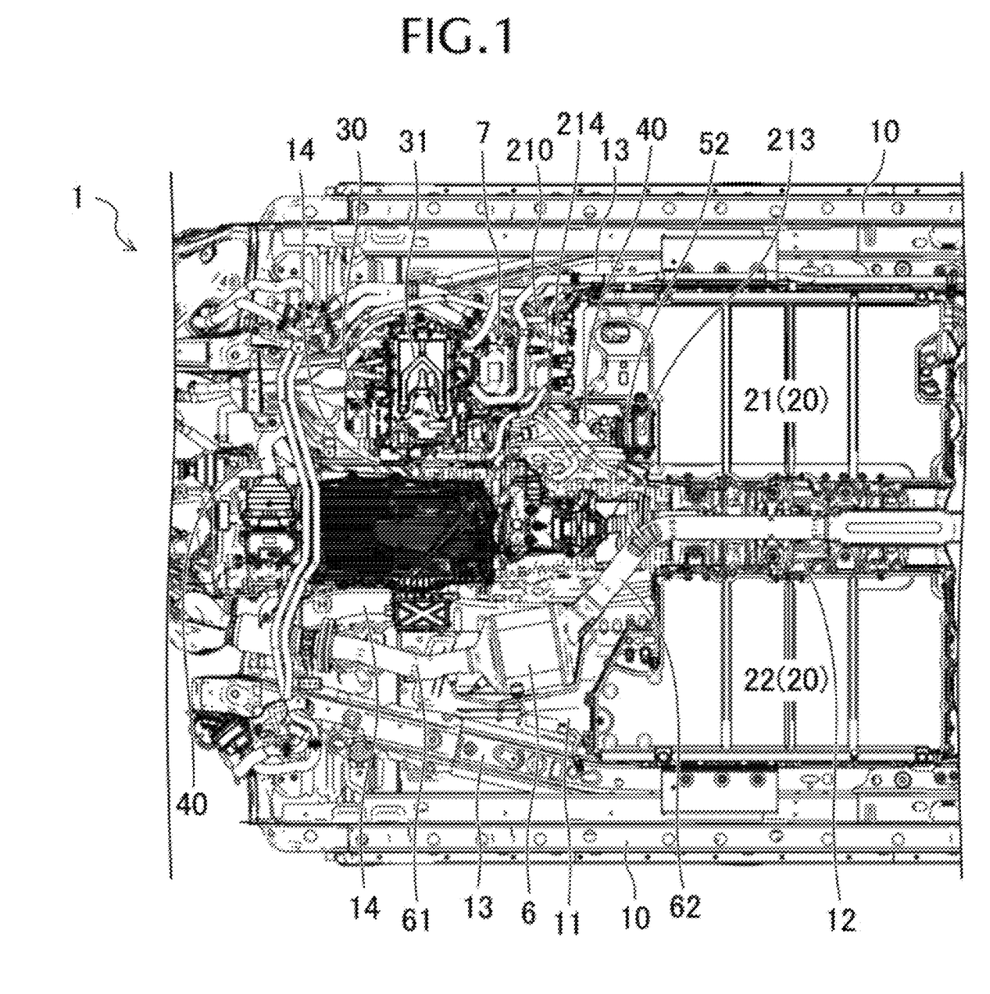
FIG. 1 is a bottom view of a lower structure for a hybrid automobile.

FIG. 1 illustrates a lower structure for a hybrid automobile 1 according to the present disclosure. In FIG. 1, the up-down direction corresponds to the vehicle width direction, the left side corresponds to the vehicle front, the right side corresponds to the vehicle rear, the deep side of the page corresponds to the upper side, and the front side of the page corresponds to the lower side. Side sills 10 which extend in a vehicle front-rear direction are provided at both ends of the hybrid automobile 1 in the vehicle width direction. A substantially horizontal floor panel 11 is arranged on vehicle-width-direction inner sides of these side sills 10. In a central portion of the floor panel 11 in the vehicle width direction, a tunnel portion 12 recessed upward is provided to extend in the vehicle front-rear direction. Floor side frames 13 which extend in the front-rear direction are respectively provided between the side sills 10 and the tunnel portion 12 in the floor panel 11.

As illustrated in FIG. 1, on both sides of the tunnel portion 12 in the vehicle width direction in a lower surface of the floor panel 11 of the hybrid automobile 1, high-voltage battery units 20 are disposed which supply electric power to a vehicle drive motor. The high-voltage battery units 20 are configured as a pair of left and right high-voltage battery units 20, the left battery unit 21 is disposed on a left side in the vehicle width direction (upper side in FIG. 1), and the right battery unit 22 is disposed on a right side in the vehicle width direction (lower side in FIG. 1). These left battery unit 21 and right battery unit 22 are lithium-ion batteries, for example, and are high-voltage direct-current electric power sources. The left battery unit 21 and the right battery unit 22 are suspended between the floor side frames 13 and the tunnel side frames 14 forming the tunnel portion 12.

Figure 2:
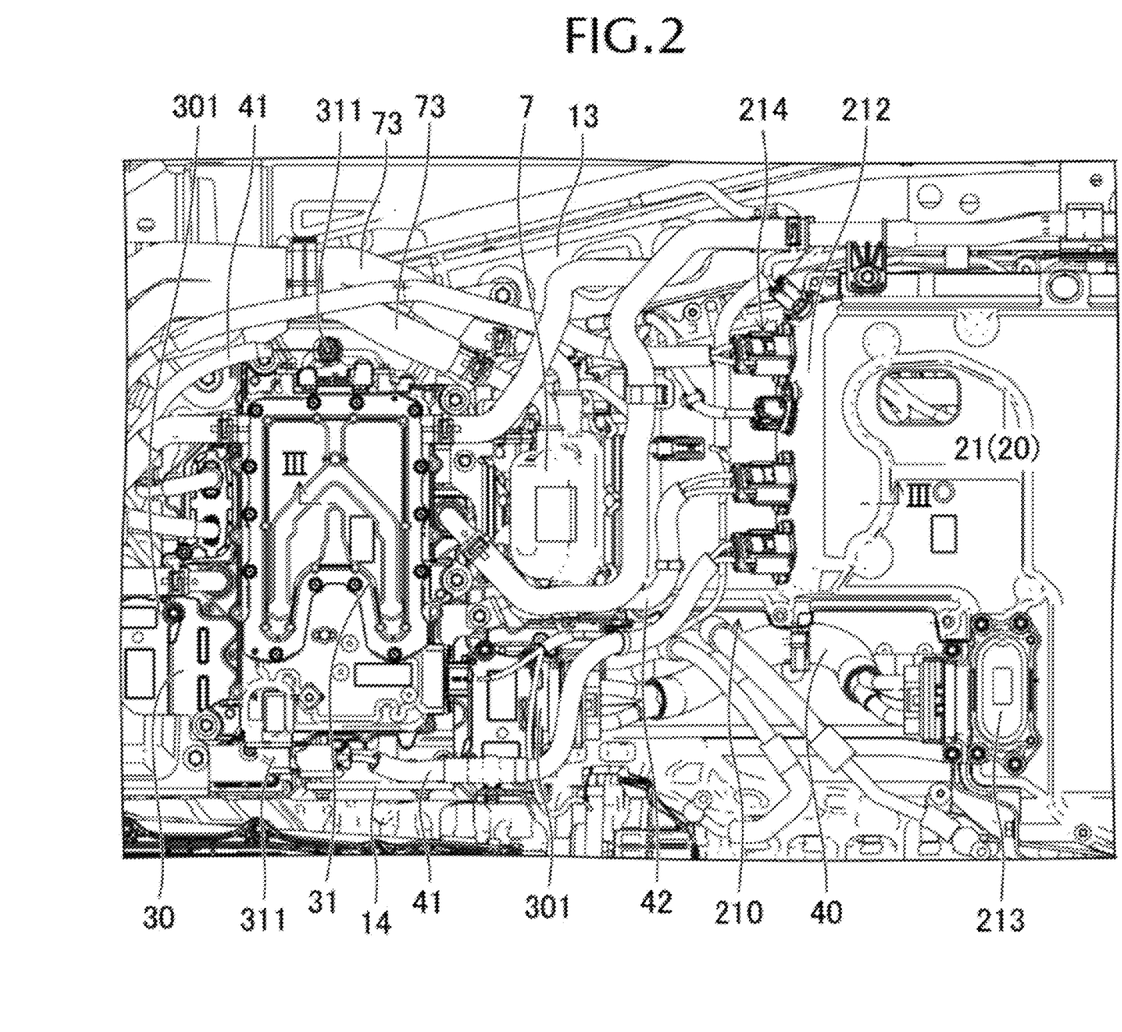
FIG. 2 is an enlarged view of principal components in FIG. 1.
Figure 3:
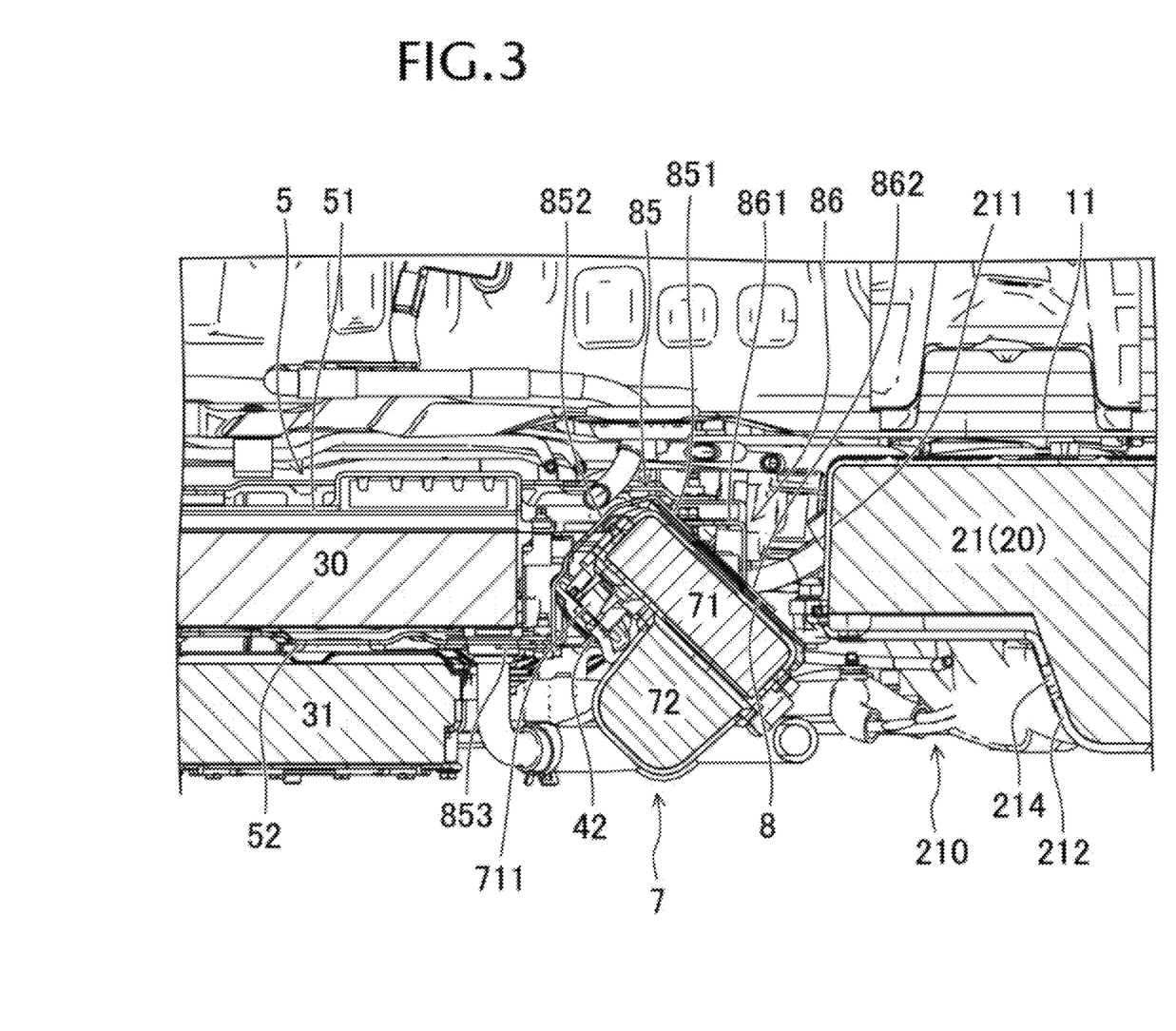
FIG. 3 is a cross-sectional view taken along line III-III in FIG. 2.

As illustrated in FIG. 2, a front portion (left side in FIG. 2) of the left battery unit 21 is protruded farther forward on a vehicle-width-direction outer side (upper side in FIG. 2) than on a vehicle-width-direction inner side (lower side in FIG. 2). A front face 210 directed to the vehicle front is formed in this protruded portion. An IV (inverter) harness connection portion 213 is provided to a portion on the vehicle-width-direction inner side, which is not protruded to the front. As illustrated in FIG. 3, in the front face 210 of the left battery unit 21, a front face lower portion 212 retreats to be positioned on a vehicle rear side of a front face upper portion 211. The front face upper portion 211 is provided to be orthogonal to the vehicle front-rear direction. Further, the front face lower portion 212 is provided to be inclined in the vehicle front-rear direction such that a lower end is positioned in the rear of an upper end. A harness connection portion 214 is provided to the front face lower portion 212 of the left battery unit 21. This harness connection portion 214 is capable of connecting with four harnesses.

<Purification Device>

As illustrated in FIG. 1, in the lower surface of the floor panel 11 which is spread on a right side of the tunnel portion 12 in the vehicle width direction, a purification device 6 as an exhaust system component of a vehicle drive engine is disposed in front of the right battery unit 22. This purification device 6 is for purifying engine exhaust gas, which passes through its internal portion, by a catalyst. This purification device 6 generates heat accompanying purification of exhaust gas passing through the internal portion.

A front-side exhaust pipe 61 extending toward the vehicle front is connected with a front portion of the purification device 6. A front end of this front-side exhaust pipe 61 is connected with an exhaust manifold of the engine. Further, a rear-side exhaust pipe 62 extending toward the vehicle rear is connected with a rear portion of the purification device 6. This rear-side exhaust pipe 62 extends while being inclined to a center in the vehicle width direction toward the vehicle rear and then extends rearward through the tunnel portion 12.

<Inverter and Converter>

As illustrated in FIG. 1, an inverter 30 and a converter 31 as the high-voltage devices are disposed in front of the left battery unit 21. These inverter 30 and converter 31 are provided on the opposite side in the vehicle width direction to the above-described purification device 6 across the tunnel portion 12. Accordingly, these inverter 30 and converter 31 can be protected from heat damage due to heat generated by the purification device 6.

As illustrated in FIG. 3, these inverter 30 and converter 31 are mounted between the floor side frame 13 and the tunnel side frame 14 via a high-voltage device mounting bracket 5 in a state where the inverter 30 and converter 31 are stacked in an up-down direction. External shapes of the inverter 30 and the converter 31 are rectangular box shapes having longitudinal and lateral dimensions longer than thickness dimensions. As for the inverter 30 and the converter 31, their dimensions in the front-rear (longitudinal) direction are longer than their dimensions in the vehicle width (lateral) direction. The dimensions of these inverter 30 and converter 31 in the vehicle width direction are generally the same. Further, the dimension of the inverter 30 in the front-rear direction is longer than the dimension of the converter 31 in the front-rear direction.

Although not illustrated, three switching circuits are built in the inverter 30 while being aligned in one lateral line. The inverter 30 performs switching processes by these switching circuits and thereby outputs a controlled three-phase alternating current to the motor. The inverter 30 is controlled, and the motor thereby drives the vehicle by a predetermined output.

As illustrated in FIG. 1 and FIG. 2, the inverter 30 has, in its front end portion and rear end portion, inverter-side connection portions 301 for connection with IV harnesses 40. The inverter-side connection portion 301 on a front side is connected with the motor and so forth via the IV harness 40. Further, the inverter-side connection portion 301 on a rear side is connected with the IV harness connection portion 213 of the left battery unit 21 via the IV harness 40.

The converter 31 is for dropping a direct-current voltage of the high-voltage battery unit 20 (so-called DC-to-DC converter). Although not illustrated, a step-down circuit including plural switching elements such as IGBTs, a capacitor, and a coil is provided in an internal portion of the converter 31. The converter 31 performs ON-OFF control of the switching elements and can thereby drop a voltage of a direct current.

As illustrated in FIG. 1 and FIG. 2, the converter 31 has, on both sides in the vehicle width direction (up-down direction in FIGS. 1 and 2), converter-side connection portions 311 for connection with CV (converter) harnesses 41. The converter-side connection portion 311 on a right side (lower sides in FIGS. 1 and 2) is connected with the harness connection portion 214 of the left battery unit 21 via the CV harness 41. Further, the converter-side connection portion 311 on a left side (upper sides in FIGS. 1 and 2) is connected with the CV harness 41 for an output.

<High-Voltage Device Mounting Bracket>

Figure 5:
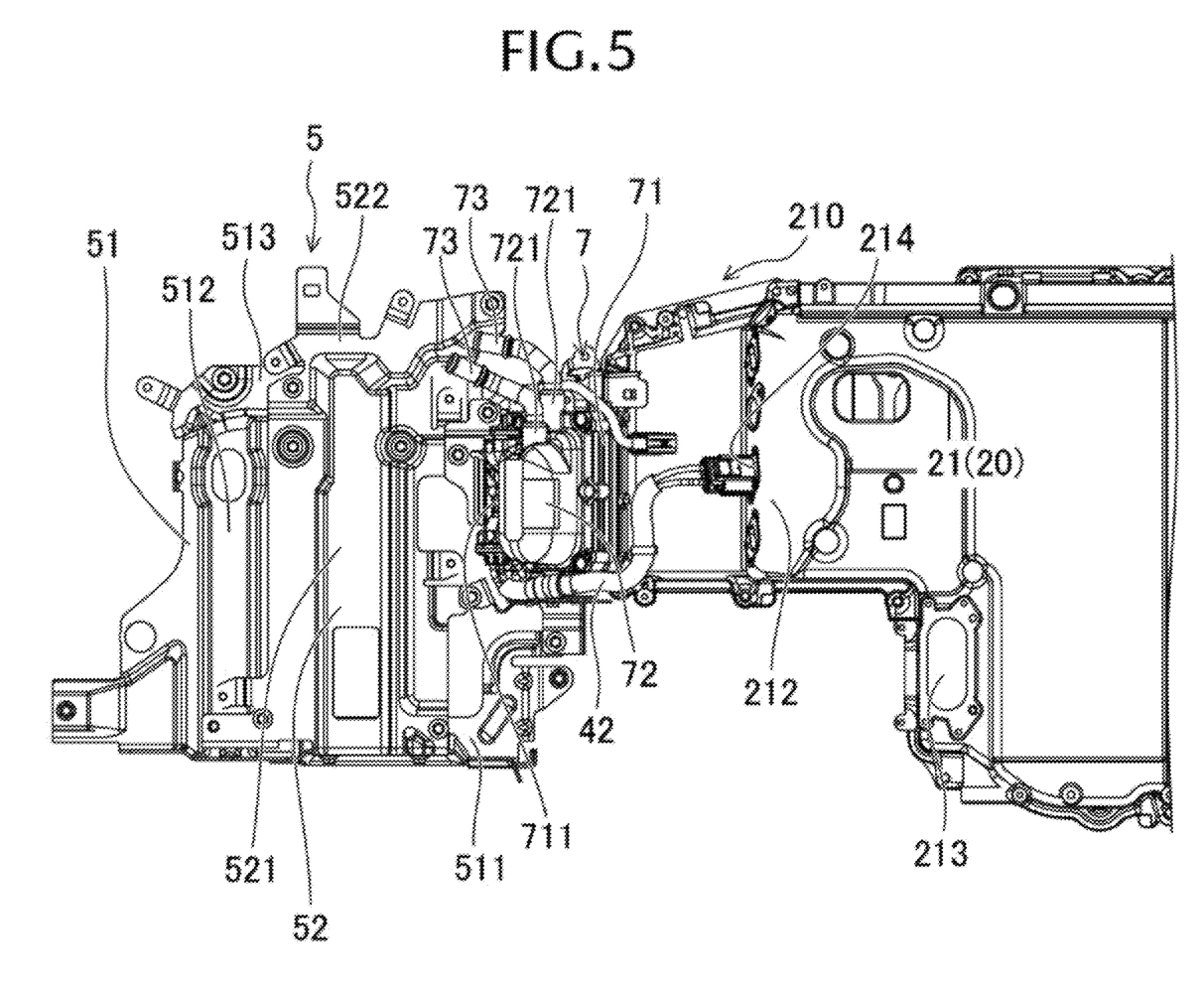
FIG. 5 is a diagram illustrating all principal components in FIG. 4.
Figure 6:
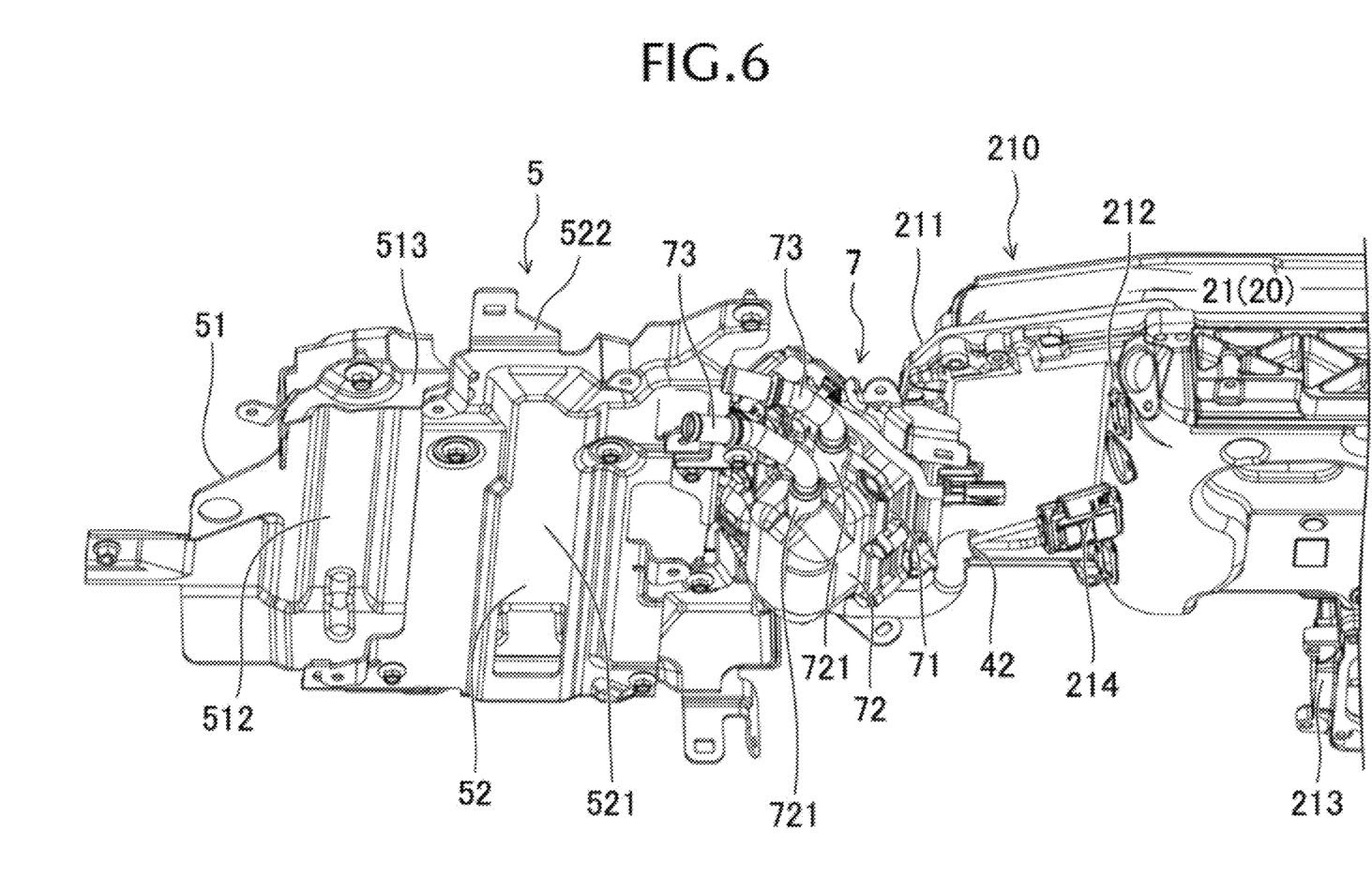
FIG. 6 is a perspective view of FIG. 5 as seen from an obliquely left lower position.

As described above, the inverter 30 and the converter 31 are mounted between the floor side frame 13 and the tunnel side frame 14 via the high-voltage device mounting bracket 5 in a state where the inverter 30 and the converter 31 are stacked in the up-down direction. FIG. 5 to FIG. 6 illustrate the high-voltage device mounting bracket 5. The high-voltage device mounting bracket 5 is formed by press processing of a metal plate.

Figure 7:
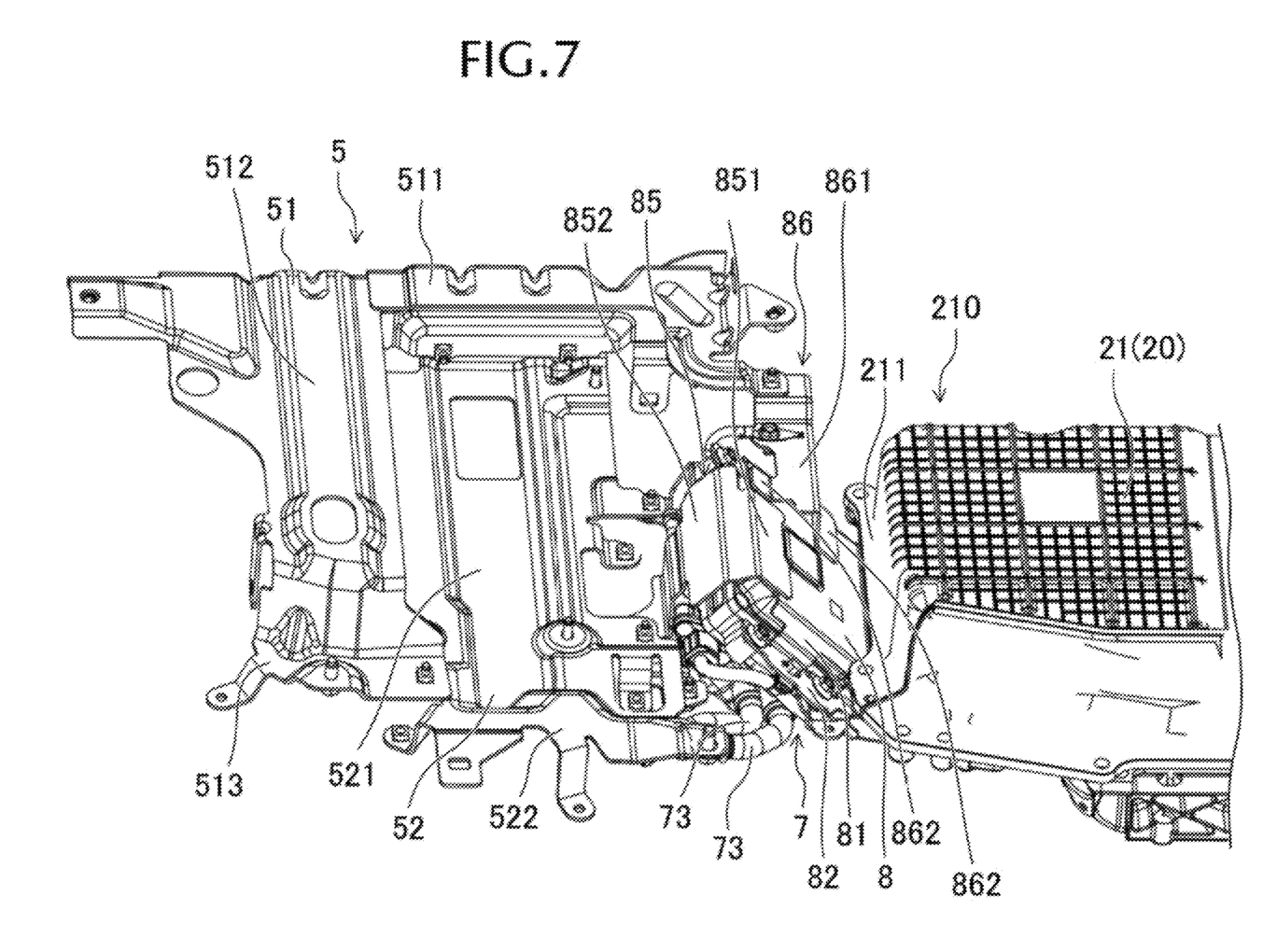
FIG. 7 is a perspective view of FIG. 5 as seen from an obliquely left upper position.
Figure 8:
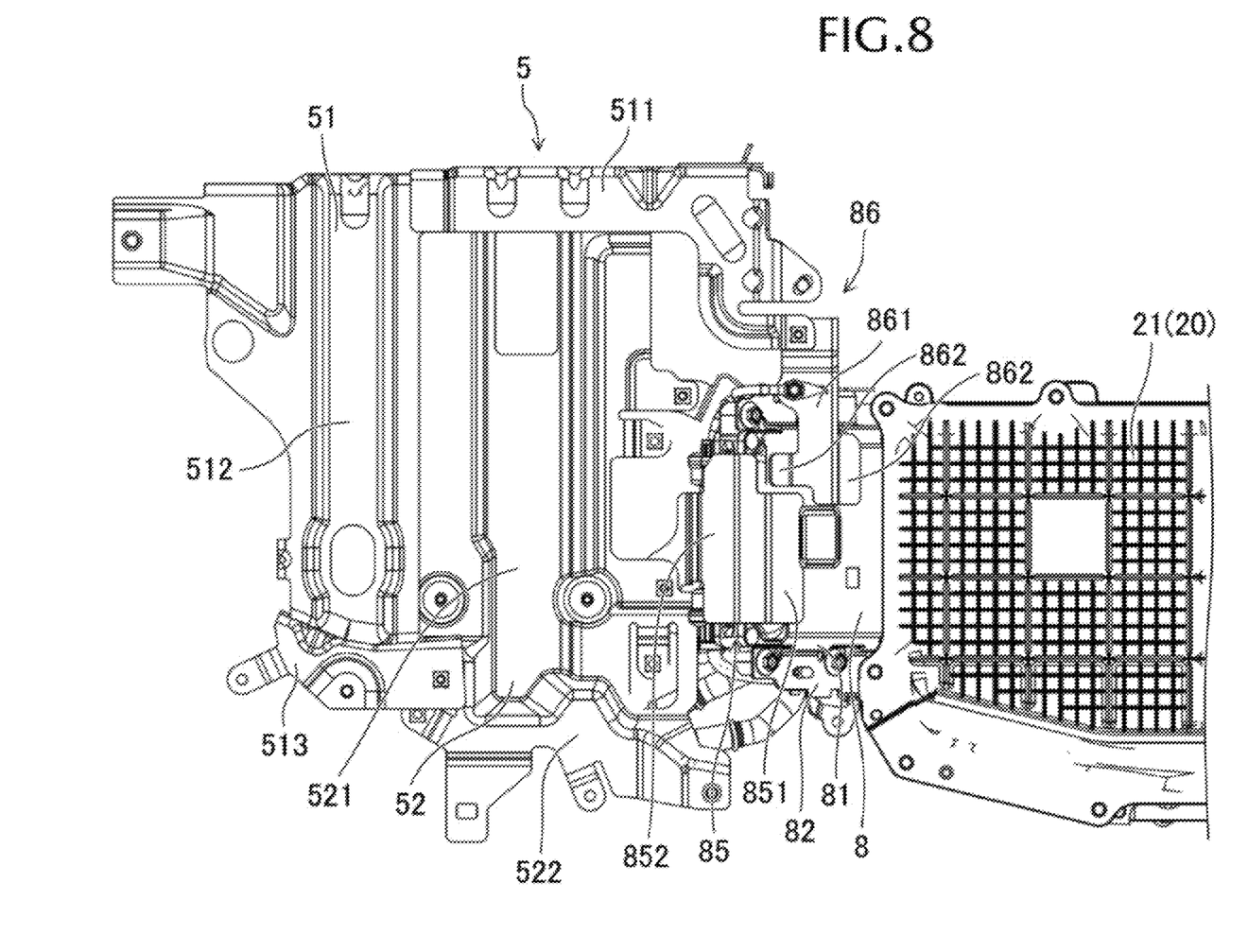
FIG. 8 is a top view of FIG. 5 as seen from above.

The high-voltage device mounting bracket 5 is configured with an upper bracket 51 and a lower bracket 52. As illustrated in FIG. 5 and FIG. 6, when seen in the up-down direction, the lower bracket 52 has a generally oblong external shape which is longer in a left-right direction than in the front-rear direction. As illustrated in FIG. 7 and FIG. 8, when seen in the up-down direction, the upper bracket 51 has a generally L-shaped external shape.

A predetermined bending structure and a predetermined uneven structure are formed in each of the upper bracket 51 and the lower bracket 52. These bending structure and uneven structure strengthen rigidity of each of the upper bracket 51 and the lower bracket 52.

The upper bracket 51 has an upper inside mounting portion 511 extending in the front-rear direction and a suspending portion 512 which extends in the vehicle width direction from an end of the upper inside mounting portion 511 on the front side. An upper outside mounting portion 513 is provided to a tip end of the suspending portion 512. The upper inside mounting portion 511 and the upper outside mounting portion 513 are provided with plural fastening seats for fastening mounting bolts.

The lower bracket 52 has a bottom plate portion 521 in a generally oblong plate shape and a lower outside mounting portion 522 which is provided in an end portion of the bottom plate portion 521 on a vehicle-width-direction outer side in the longitudinal direction of the bottom plate portion 521. The lower outside mounting portion 522 is provided with plural fastening seats for fastening mounting bolts. The upper bracket 51 and lower bracket 52 are integrated by fastening them by bolts in a state where the upper bracket 51 and lower bracket 52 are opposed to each other in the up-down direction.

The upper inside mounting portion 511 is mounted on the tunnel side frame 14 by the mounting bolts via the fastening seats. Further, the upper outside mounting portion 513 is mounted on the floor side frame 13 by the mounting bolts via the fastening seats. Accordingly, the high-voltage device mounting bracket 5 is mounted on the lower surface of the floor panel 11.

As illustrated in FIG. 3, the inverter 30 is arranged between the upper bracket 51 and the lower bracket 52. This inverter 30 is placed on the bottom plate portion 521 and is fastened by bolts. Further, the converter 31 is fastened to a lower surface of the lower bracket 52 by the mounting bolts. In such a manner, the inverter 30 and the converter 31 are mounted between the floor side frame 13 and the tunnel side frame 14 in a state where the inverter 30 and the converter 31 are stacked in the up-down direction.

<PTC Heater>

As illustrated in FIG. 1 and FIG. 2, a positive temperature coefficient (PTC) heater 7 as in-vehicle equipment is disposed between the left battery unit 21 and the inverter 30 and converter 31. The PTC heater 7 is for electrically heating engine cooling water. The engine cooling water heated by the PTC heater 7 is used for a heater or the like for air conditioning in the hybrid automobile 1. The PTC heater 7 is provided on the opposite side in the vehicle width direction to the above-described purification device 6 across the tunnel portion 12. Accordingly, the PTC heater 7 can be protected from heat damage due to heat generated by the purification device 6.

As illustrated in FIG. 3, the PTC heater 7 has a heater unit 71 in a rectangular box shape having longitudinal and lateral dimensions longer than a thickness dimension in a horizontal state where an upper surface of the PTC heater 7 is made horizontal. Further, in a lower portion of this heater unit 71, a tank unit 72 is provided which has a dimension in the front-rear direction shorter than that of the heater unit 71 and a thickness dimension longer than that of the heater unit 71. Accordingly, in the PTC heater 7 in the horizontal state, its dimension in the front-rear direction is longer than its thickness dimension.

Figure 4:
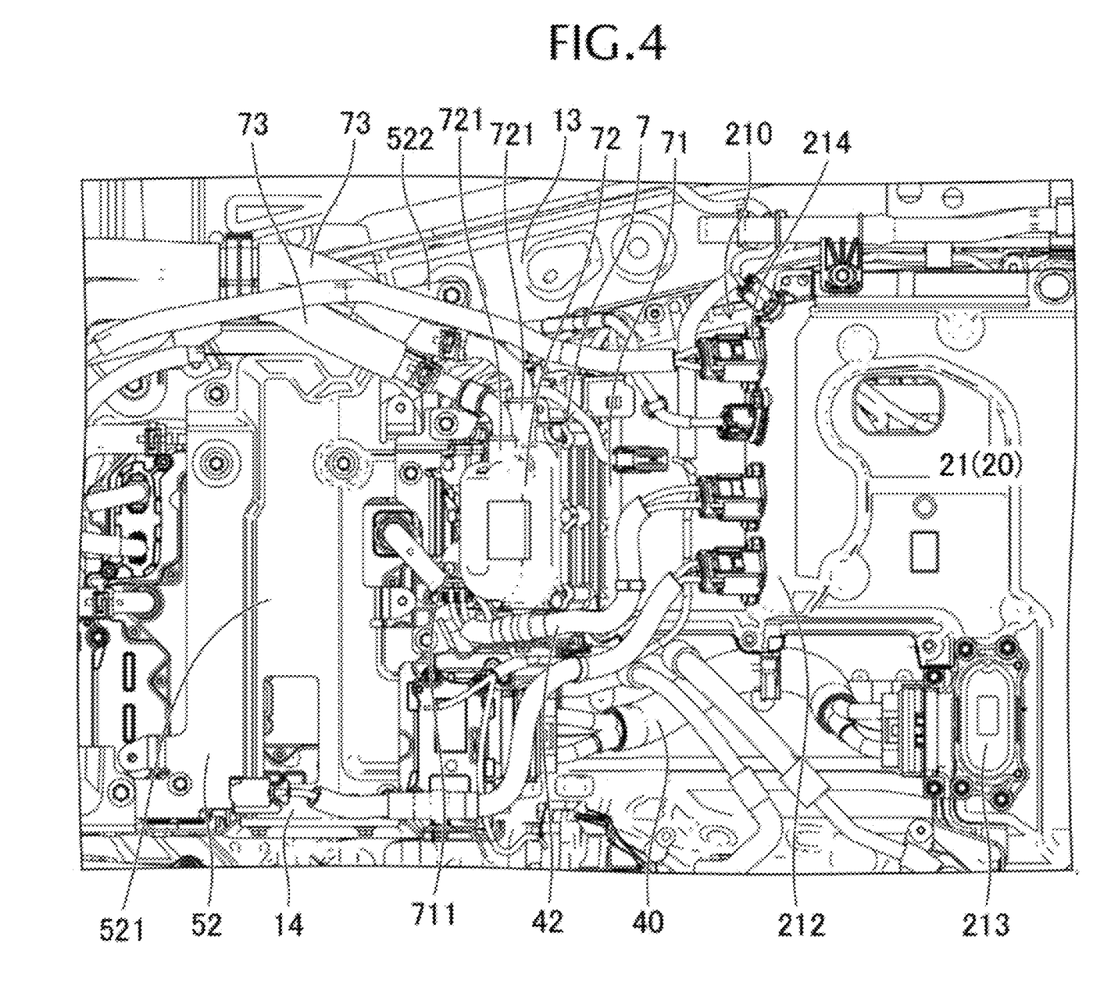
FIG. 4 is a diagram corresponding to FIG. 2, from which a converter is omitted.

As illustrated in FIG. 3 to FIG. 5, the heater unit 71 of the PTC heater 7 has a heater-side connection portion 711 for connecting a heater harness 42 with a lower portion on the front side. The heater-side connection portion 711 is connected with the harness connection portion 214 of the left battery unit 21 via the heater harness 42. In other words, the PTC heater 7 is a high-voltage apparatus which works by being fed with electricity from the high-voltage battery unit 20 via the heater harness 42.

As illustrated in FIG. 4 and FIG. 5, water distribution pipe connection portions 721 are provided to two portions of the tank portion 72 of the PTC heater 7 on the vehicle-width-direction outer-side (upper side in FIG. 5). Water distribution pipes 73 and 73 for circulating the engine cooling water are respectively connected with these water distribution pipe connection portions 721. The engine cooling water is supplied to the tank unit 72 via one of these water distribution pipes 73, and the engine cooling water is discharged from the tank unit 72 via the other.

As illustrated in FIG. 3, the PTC heater 7 is disposed to be in an inclined state where an upper surface of the heater unit 71 is downward inclined with respect to the vehicle front-rear direction such that a back end (right end in FIG. 3) comes to a lower position than a front end (left end in FIG. 3). The dimension of the PTC heater 7 in the front-rear direction in this inclined posture is shorter than the dimension of the PTC heater 7 in the front-rear direction in the horizontal state where the upper surface of the heater unit 71 is horizontal. A back end of the upper surface of this inclined heater unit 71 faces the front face lower portion 212 of the left battery unit 21.

As described above, the PTC heater 7 is inclined such that the back end of the upper surface faces the front face lower portion 212 of the left battery unit 21, and the PTC heater 7 can thereby compactly be disposed in a narrow space between the left battery unit 21 and the inverter 30 and converter 31. Further, the harness connection portion 214 is provided to the front face lower portion 212, which the PTC heater 7 faces, of the left battery unit 21. Thus, because the distance between the PTC heater 7 and the harness connection portion 214 is short, the length of the heater harness 42 can be made short, the heater harness 42 connecting the PTC heater 7 with the harness connection portion 214 of the left battery unit 21. Accordingly, electric connection between the PTC heater 7 and the left battery unit. 21 can be made compact.

<Mounting Plate>

As illustrated in FIG. 3, FIG. 7, and FIG. 8, a mounting plate 8 for supporting the PTC heater 7 on the lower surface of the floor panel 11 is fixed to an upper portion of the PTC heater 7. This mounting plate 8 is provided such that an inclination of the upper portion of the PTC heater 7 is used and an upper surface of the mounting plate 8 is thereby downward inclined toward the vehicle rear. An upper surface back end of this mounting plate faces the front face lower portion 212 of the left battery unit 21.

As illustrated in FIG. 7 to FIG. 10, the mounting plate 8 has a rectangular shape. Bending portions 81 which are bent downward at a right angle to the upper surface of the mounting plate 8 are formed on both sides of the mounting plate 8 in the vehicle width direction. A securing portion 82 extending outward is formed at a lower end of each of the bending portions 81. The PTC heater 7 is mounted on each of the securing portions 82 via the mounting bolts. Accordingly, the PTC heater 7 is fixed to the mounting plate 8.

Figure 9:
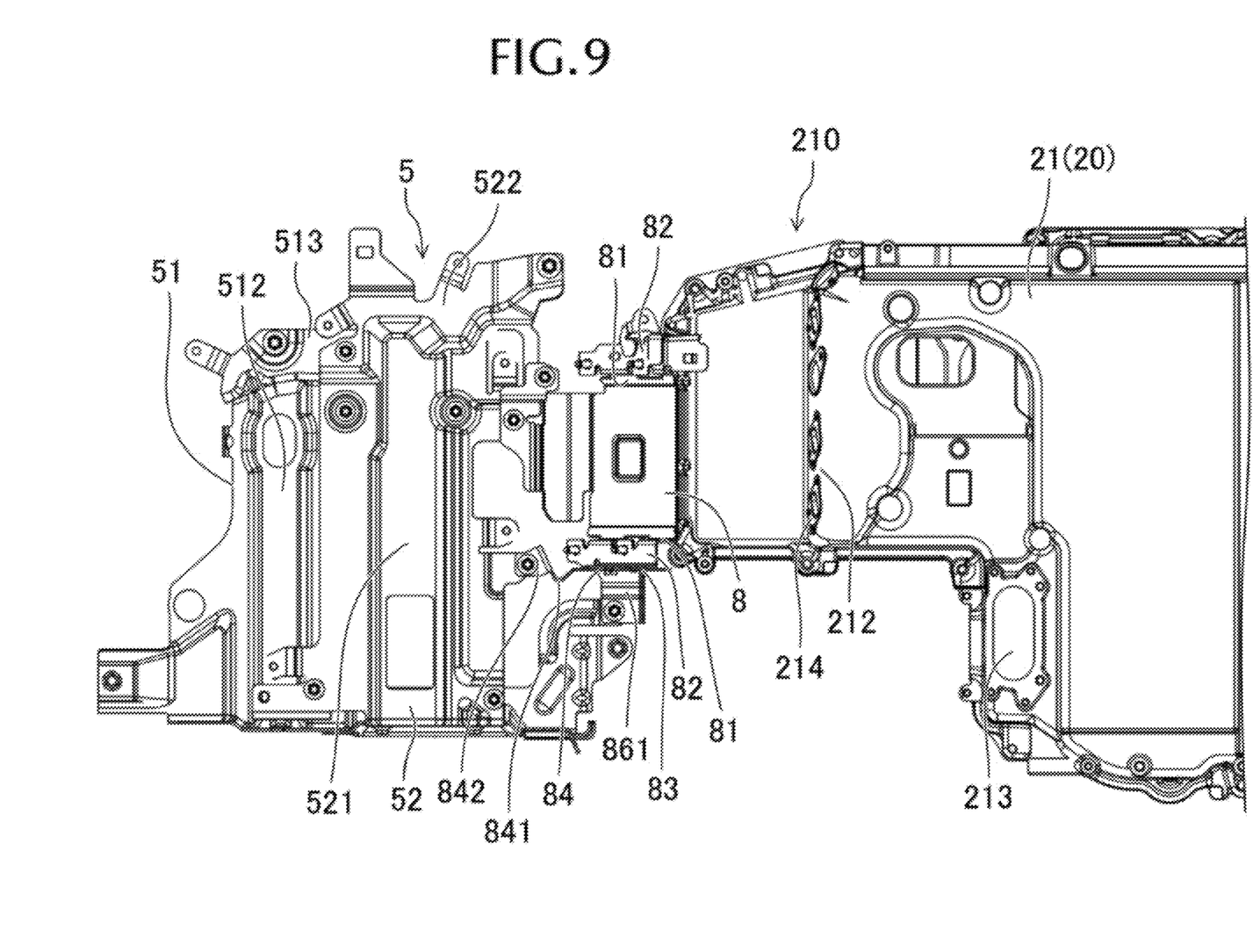
FIG. 9 is a diagram corresponding to FIG. 5, from which a PTC heater is omitted.
Figure 10:
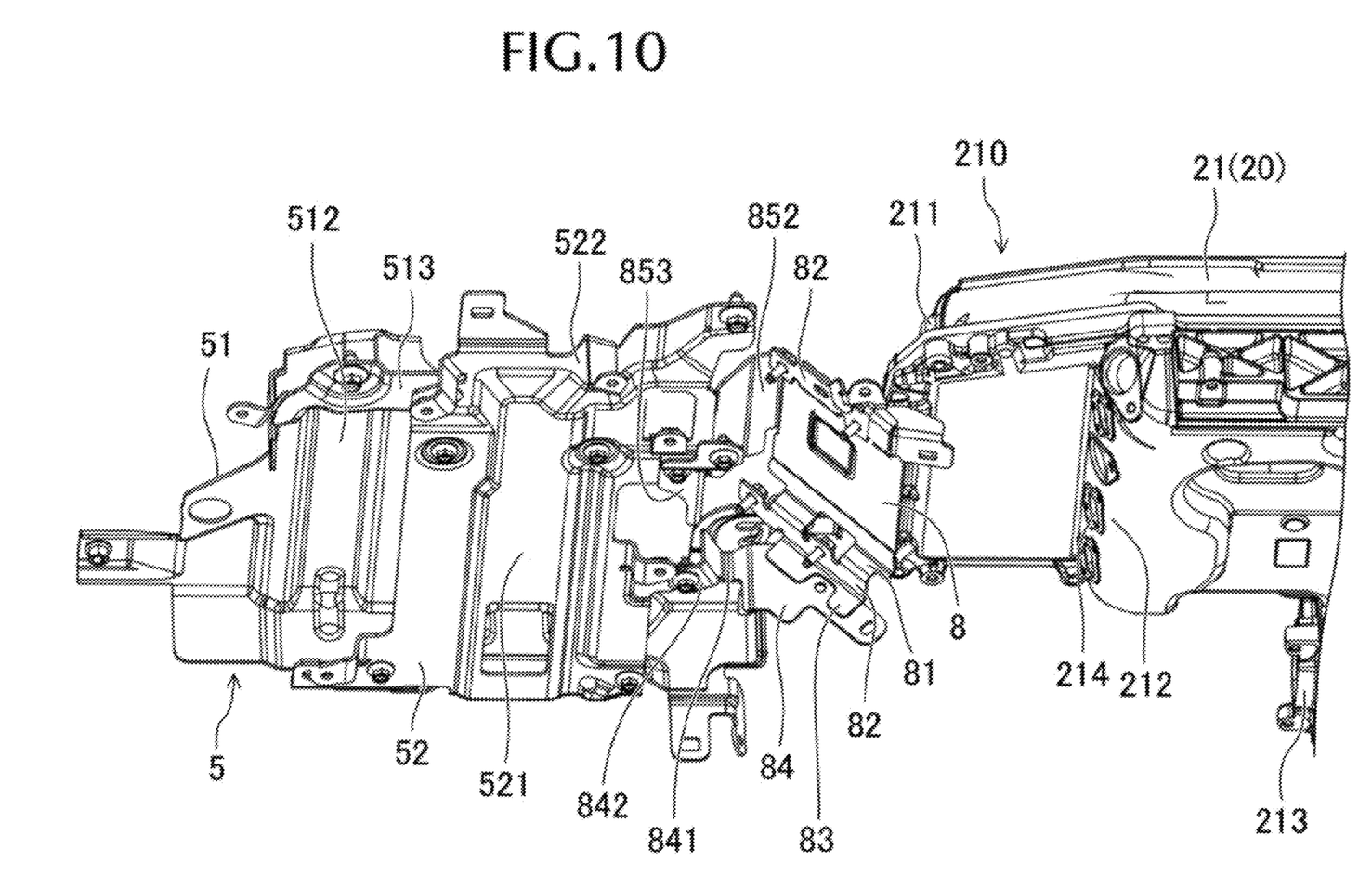
FIG. 10 is a diagram corresponding to FIG. 6, from which the PTC heater is omitted.

As illustrated in FIG. 9 and FIG. 10, an end portion of the securing portion 82 on the vehicle-width-direction inner side, the securing portion 82 being provided on the vehicle-width-direction inner side, is bent downward, and an inner-side end portion 83 is formed. This inner-side end portion 83 is provided with a plate-shaped inner side mounting plate 84 which extends downward and has an upper portion inclined along the inclination of the mounting plate 8. As illustrated in FIG. 9, a bent portion 841 which is bent to the vehicle-width-direction outer side (upper side in FIG. 9) is provided to an end portion of the inner side mounting plate 84 on the front side (left side in FIG. 9). An inner-side mounting plate fastening portion 842 extending forward is provided to a lower end at a front-side end of the bent portion 841. The inner-side mounting plate fastening portion 842 is mounted on the lower bracket 52 of the high-voltage device mounting bracket 5 by the mounting bolt.

Further, as illustrated in FIG. 3 and FIG. 7, a plate front-side bracket 85 is provided on a front side of the upper surface of the mounting plate 8. As illustrated in FIG. 3, this plate front-side bracket 85 has a front-side securing portion 851 which is fixed to the upper surface of the heater unit 71. A U-shaped portion 852 is provided to a front end of the front-side securing portion 851, the U-shaped portion 852 opening rearward and downward and being bent into a general U-shape when seen in the vehicle width direction. Further, a front-side bracket fastening portion 853 extending forward is provided to a lower end of the U-shaped portion 852. The front-side bracket fastening portion 853 is mounted on the lower bracket 52 of the high-voltage device mounting bracket 5 by the mounting bolt.

As illustrated in FIG. 7 and FIG. 8, a plate inner-side bracket 36 is provided on the vehicle-width-direction inner side (upper side in FIG. 8) of the mounting plate B. As illustrated in FIG. 7, the plate inner-side bracket 86 has an L-shaped portion 861 which is bent into a general L-shape when seen in the vehicle width direction. An inner-side bracket securing portion 862 which is fixed to the upper surface of the mounting plate 8 is provided to an end portion of the L-shaped portion 861 on the vehicle-width-direction outer-side. The end portion of the L-shaped portion 861 on the vehicle-width-direction inner side extends to a lower side of a back end of the upper inside mounting portion 511 of the high-voltage device mounting bracket 5 and is mounted on the back end of the upper inside mounting portion 511 by the mounting bolts.

<Protection of PTC Heater by Mounting Plate>

Protection of the PTC heater 7 by the mounting plate 8 will be described by using FIG. 3. The mounting plate 8 according to the present disclosure protects the PTC heater 7 from an impact in a vehicle collision (front collision).

When a collision occurs to the hybrid automobile 1, the impact of the collision moves the mounting plate 8 and the PTC heater 7 to the rear side (right side in FIG. 3). As illustrated in FIG. 3, because the back end of the upper surface of the mounting plate 8 faces the front face lower portion 212 of the left battery unit 21, the upper surface of the mounting plate 8 is opposed to the front face upper portion 211 of the left battery unit 21. Thus, when the mounting plate 8 and the PTC heater 7 move to the rear side, the front face upper portion 211 of the left battery unit 21 contacts with the upper surface of the mounting plate 8. In this case, the contact occurs in a manner such that the front face upper portion 211 of the left battery unit 21 relatively slides on the upper surface of the mounting plate 8 along the inclination of the mounting plate 8. Because the contact occurs in a sliding manner, the impact applied to the left battery unit 21 and the PTC heater 7 due to this contact can be reduced.

Further, the front face upper portion 211 of the left battery unit 21 relatively slides on the upper surface of the mounting plate 8, and the mounting plate 8 and the PTC heater 7 are thereby guided to fall, toward the vehicle rear. Accordingly, the mounting plate 8 and the PTC heater 7 which are moved rearward by the vehicle collision can be retracted to a space produced by retreat of the front face lower portion 212 of the left battery unit 21.

What is claimed is:

1. A lower structure for a hybrid automobile in which a high-voltage battery is disposed in a lower surface of a floor panel, the lower structure comprising:
    an engine exhaust system component which is disposed in front of the high-voltage battery in the lower surface of the floor panel and on one vehicle-width-direction side of a center in a vehicle width direction; and
    a high-voltage device which is disposed in front of the high-voltage battery in the lower surface of the floor panel and on another vehicle-width-direction side of the center in the vehicle width direction, the lower structure being characterized in that
    in-vehicle equipment is disposed between the high-voltage battery and the high-voltage device, and
    the in-vehicle equipment is in an inclined state where an upper surface of the in-vehicle equipment is inclined in a front-rear direction such that the in-vehicle equipment has a shorter dimension in the front-rear direction than a dimension in a horizontal state where the upper surface becomes horizontal.

2. The lower structure for a hybrid automobile according to claim 1, characterized in that
    the high-voltage battery retreats such that a front face lower portion is positioned on a vehicle rear side of a front face upper portion,
    the in-vehicle equipment is in an inclined state where the upper surface is downward inclined toward vehicle rear such that a back end comes to a lower position than a front end, and
    a back end of the upper surface of the in-vehicle equipment faces the front face lower portion of the high-voltage battery.

3. The lower structure for a hybrid automobile according to claim 1, characterized in that
    the in-vehicle equipment is fixed to a mounting plate having an upper surface downward inclined toward vehicle rear and is connected to the floor panel via the mounting plate, and
    an upper surface back end of the mounting plate faces the front face lower portion of the high-voltage battery.

4. The lower structure for a hybrid automobile according to claim 3, characterized in that
    the high-voltage battery includes a harness connection portion in the front face lower portion.

5. The lower structure for a hybrid automobile according to claim 4, characterized in that
    the in-vehicle equipment is a high-voltage apparatus which is supplied with electric power from the harness connection portion via a harness.

6. The lower structure for a hybrid automobile according to claim 5, characterized in that
    the high-voltage apparatus is a positive temperature coefficient (PTC) heater for electrically heating engine cooling water.

7. The lower structure for a hybrid automobile according to claim 6, wherein the mounting plate supports the PTC heater during an impact in a vehicle collision.

8. The lower structure for a hybrid automobile according to claim 7, wherein the impact of the vehicle collision moves the mounting plate and the PTC heater to a rear side of the lower structure.

9. The lower structure for a hybrid automobile according to claim 2, characterized in that
    the in-vehicle equipment is fixed to a mounting plate having an upper surface downward inclined toward vehicle rear and is connected to the floor panel via the mounting plate, and
    an upper surface back end of the mounting plate faces the front face lower portion of the high-voltage battery.

10. The lower structure for a hybrid automobile according to claim 9, characterized in that
    the high-voltage battery includes a harness connection portion in the front face lower portion.

11. The lower structure for a hybrid automobile according to claim 10, characterized in that
    the in-vehicle equipment is a high-voltage apparatus which is supplied with electric power from the harness connection portion via a harness.

12. The lower structure for a hybrid automobile according to claim 11, characterized in that
    the high-voltage apparatus is a PTC heater for electrically heating engine cooling water.

* * * * *